(12) United States Patent
Naumovich et al.

(10) Patent No.: US 7,150,003 B2
(45) Date of Patent: Dec. 12, 2006

(54) CLASS COALESCENCE FOR OBFUSCATION OF OBJECT-ORIENTED SOFTWARE

(75) Inventors: Gleb Naumovich, New York, NY (US); Ezgi Yalcin, Brooklyn, NY (US); Nasir D. Memon, Holmdel, NJ (US); Hong Heather Yu, West Windsor, NJ (US); Mikhail Sosonkin, Brooklyn, NY (US)

(73) Assignee: Matsushita Electric industrial Co., Ltd., Osaka (JP)

( * ) Notice: Subject to any disclaimer, the term of this patent is extended or adjusted under 35 U.S.C. 154(b) by 526 days.

(21) Appl. No.: 10/305,200

(22) Filed: Nov. 25, 2002

(65) Prior Publication Data
US 2004/0103404 A1 May 27, 2004

(51) Int. Cl.
*G06F 9/44* (2006.01)
(52) U.S. Cl. ............... 717/108; 713/176; 713/190; 713/199; 717/132; 717/126
(58) Field of Classification Search ............... 717/108, 717/132, 126; 713/176, 190, 194
See application file for complete search history.

(56) References Cited
U.S. PATENT DOCUMENTS

| | | | | |
|---|---|---|---|---|
| 6,006,328 A * | 12/1999 | Drake | ............... | 713/200 |
| 6,289,455 B1 * | 9/2001 | Kocher et al. | ............... | 713/194 |
| 6,374,402 B1 * | 4/2002 | Schmeidler et al. | ......... | 717/167 |
| 6,594,761 B1 * | 7/2003 | Chow et al. | ............... | 713/190 |
| 6,615,350 B1 * | 9/2003 | Schell et al. | ............... | 713/168 |
| 6,640,305 B1 * | 10/2003 | Kocher et al. | ............... | 713/194 |
| 6,668,325 B1 * | 12/2003 | Collberg et al. | ............ | 713/194 |
| 6,779,114 B1 * | 8/2004 | Gu et al. | .................... | 713/189 |
| 6,829,710 B1 * | 12/2004 | Venkatesan et al. | ......... | 713/176 |
| 6,842,862 B1 * | 1/2005 | Chow et al. | ............... | 713/190 |
| 6,898,706 B1 * | 5/2005 | Venkatesan et al. | ......... | 713/167 |

OTHER PUBLICATIONS

Manufacturing Cheap, Resilient and Stealthy Opaque Constructs, Christian Goldberg et al, ACM, 1998, pp. 184-196.*
"Breaking Abstraction and Unstructuring Data Structures", IEEE, C. Collberg, et al, May 1998.*

* cited by examiner

*Primary Examiner*—Todd Ingberg
(74) *Attorney, Agent, or Firm*—RatnerPrestia (57) ABSTRACT

A method of obfuscating an object-oriented program is provided. A program is provided that is defined in terms of a plurality of classes. Each of the classes has at least one of a field and a method. At least two of the plurality of classes are combined into a combined class. When the at least two classes are combined, at least one field from at least one of the two classes is included in the combined class, and/or at least one method from at least one of the two classes is included in the combined class. After the at least two classes are combined, the program is transmitted.

20 Claims, 6 Drawing Sheets

CLASS COALESCENCE FOR OBFUSCATION OF OBJECT-ORIENTED SOFTWARE

FIELD OF THE INVENTION

The present invention relates generally to the obfuscation of software programs, and more particularly to the obfuscation of object-oriented programs through class coalescence.

BACKGROUND OF THE INVENTION

Through the numerous distribution mechanisms, software is increasingly distributed as original source code or in forms that can be easily converted to source code. For example, generally, Java bytecodes may be converted into source code. Often, such codes may be easily de-compiled, and as such, malicious parties may be able to steal any associated intellectual property with relative ease. Furthermore, software tampering with malicious intent, for example, planting a Trojan horse in the end user's system, is a very undesirable possibility.

Thus, it would be desirable to have efficient and effective mechanisms for protecting software and associated intellectual property. In some applications, dedicated hardware with integrated decryption and execution units are available. In such an application, the cryptographic solution may provide secure protection of software. However, if a piece of software runs on standard hardware without any changes to virtual machines or available interpreters, other software protection mechanisms are desirable.

Software systems are increasingly written in object-oriented programming languages, such as C++ and Java. Object-oriented languages provide a natural framework for programmers to express the overall design and the intent of individual operations carried out by programs. Oftentimes there is a desire for object-oriented programmers to provide understandable and modifiable programs so that another programmer can later alter the original program for his or her own purpose. As such, object-oriented programs and applications are especially susceptible to piracy and other forms of malicious conduct. Therefore, in object-oriented programs and applications, it is particularly desirable to develop a viable approach to protecting software.

SUMMARY OF THE INVENTION

In an exemplary embodiment of the present invention, a method of obfuscating an object-oriented program is provided. The inventive method includes a step of providing a program that is defined in terms of a plurality of classes. Each of the classes in the program has at least one of a field and a method. The inventive method also includes a step of combining at least two of the plurality of classes into a combined class. The step of combining includes at least one of a step of (a) including at least one field from at least one of the two classes in the combined class, and a step of (b) including at least one method from at least one of the two classes in the combined class.

In another exemplary embodiment of the present invention, another method of obfuscating an object-oriented program is provided. The method includes a step of copying a first program to provide a second program. The method also includes a step of combining a first class and a second class included in the first program to produce a combined class in the second program. The method further includes a step of replacing all uses of the first class and the second class in the second program with respective uses of the combined class in the second program.

In yet another exemplary embodiment of the present invention, yet another method of obfuscating an object-oriented program is provided. The method includes a step of copying a first program to provide a second program. A first class and a second class that are included in the first program are combined to produce a combined class in the second program. Each of a plurality of types included in the first program are mapped with a respective type in the second program. All uses of the first class and the second class in the second program are replaced with respective uses of the combined class in the second program. The first class and the second class are removed from the second program.

BRIEF DESCRIPTION OF THE DRAWINGS

The foregoing summary as well as the following detailed description of the exemplary embodiments of the invention, will be better understood when read in conjunction with the appended drawings. For the purpose of illustrating the invention, there is shown in the drawings several exemplary embodiments of the invention. It should be understood, however, that the invention is not limited to the precise arrangements and instrumentalities shown. Included in the drawings are the following Figures.

DETAILED DESCRIPTION OF THE INVENTION

In an exemplary embodiment, the present invention relates to an obfuscation technique for programs written in an object-oriented language based on combining (coalescing) classes in a way that preserves the functional behavior of the program. In such an embodiment, if several classes are coalesced, the number of classes used by the program is reduced. The resulting obfuscation breaks abstractions represented by the coalesced classes, thereby making reverse engineering of the program more difficult. In some situations, it should be noted that class coalescence by itself may not provide sufficient obfuscation to prevent re-engineering and/or tampering. As such, it is anticipated that class coalescence may be used in conjunction with other obfuscation techniques such as variable renaming and splitting, to produce powerful and efficient obfuscation transformations.

Although the present application concentrates heavily on coalescing classes in Java programs, the invention is applicable to other object-oriented languages. In various embodiments of the present invention, any two Java classes can be coalesced. Further, throughout the present application, embodiments are identified in which the coalescing of two given classes also results in the coalescing of other classes and/or interfaces. The class coalescing techniques herein described are applicable both to complete applications and to (reusable) parts of applications, such as component libraries. Therefore, the term program is intended to refer to complete applications, partial applications, and reusable libraries.

Typically, the class coalescing techniques of the present invention do not change the number of objects created and used by the program; however, objects for which classes are changed may become larger.

To evaluate the trade-off between the strength of obfuscation and the reduction in the execution speed of the program, prototype coalescing tools have been implemented and applied to a non-trivial program with batch mode processing. The results of these experiments are encouraging, with only a relatively small increase in the running time as the number of coalesced classes is increased. In several cases, the obfuscated program is actually faster than the original program.

Figure 1:
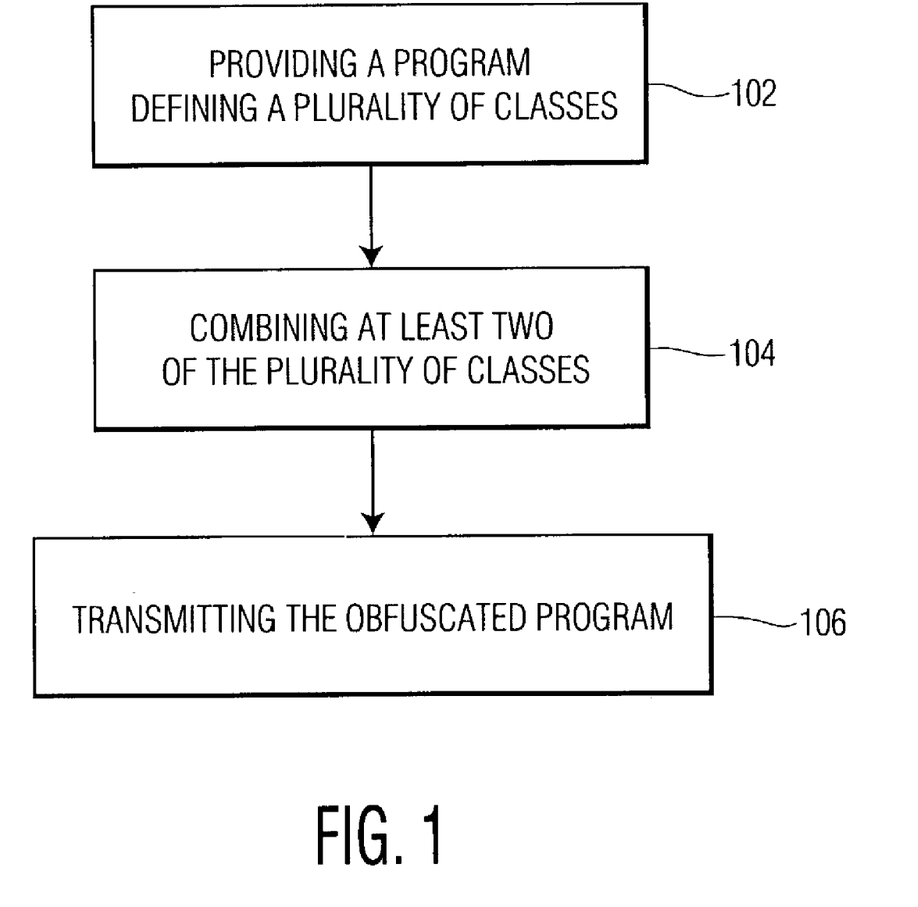
FIG. 1 is a flow chart diagram which is useful for describing an exemplary embodiment of the present invention.

FIG. 1 illustrates an exemplary method of obfuscating an object-oriented program. At step 102, a program is provided in an object oriented language. The program defines a plurality of classes. At step 104, at least two of the plurality of classes are combined into a combined class. At step 106, the obfuscated program, including the combined class, is transmitted to another location.

Two or more classes are coalesced into a single class by combining their fields and methods, thereby yielding representations of different types of data with a single, more complex type of data. Coalescing classes $c_1, c_2, \ldots c_n$ into a singe class c is done in such a way that any program object of one of types $c_1, \ldots c_2, c_n$ is replaced with an object of type c. As a result, the obfuscated program is functionally identical to the original program, but more difficult to understand. As an exemplary illustration, consider the incomplete class definitions in an original program listed in Table 1.

TABLE 1

```
class AbstractCar {
    private int id;
    public AbstractCar( ) {...}
    public int getId( ) {...}
}
class PersonalCar extends AbstractCar {
    private Person owner;
    public PersonalCar( ) {...}
    public Person getOwner( ) {...}
    public void setOwner(Person p) {...}
}
class Truck extends AbstractCar {
    private double capacity;
    public Truck(double capacity) {...}
    public double getCapacity( ) {...}
}
class Bus extends AbstractCar {
    private int capacity;
    public Bus(int capacity) {...}
    public int getCapacity( ) {...}
    public void setCapacity(int c) {...}
}
```

Class AbstractCar gives a base definition for a car, specifying only an integer ID that can be used for storing car objects in collections. Classes PersonalCar, Truck, and Bus extend AbstractCar to give more specific definitions to different types of cars. For example, an object of class Truck has a field capacity of type double that stores the maximum load that can be carried by a truck. An object of type Bus also has a field capacity, but this field is an integer and stores the maximum number of people that a bus can carry. Person is a type defined elsewhere in the program, not shown in Table 1. New objects may be generated by calling on constructors of classes. For example, a Bus object with capacity of 10 people can be produced with a statement Bus b=new Bus (10). The class listed in Table 2 is an exemplary combined class obtained by coalescing the four classes in the example in Table 1 into a single class Car.

TABLE 2

```
class Car {
    private int id;
    private Person owner;
    private double capacity1;
    private int capacity2;
    public Car(double c1, int c2) {...}
    public Person getOwner( ) {...}
    public void setOwner(Person p) {...}
    public int getCapacity1( ) {...}
    public double getCapacity2( ) {...}
    public void setCapacity(int c) {...}
}
```

Any object in the original program that has type PersonalCar, Truck, or Bus (AbstractCar is an abstract class, so no objects of this class are typically present in the program) is replaced with an object of type Car. For example, Table 3 lists a group of statements in an original program. Table 4 lists examples of functionally equivalent statements in the obfuscated program.

TABLE 3

```
Bus b = new Bus(10);
b.setCapacity(15);
Truck t = new Truck(1.5);
System.out.println(t.getCapacity( ));
```

TABLE 4

```
Car c1 = new Car(2.3, 10);
c1.setCapacity(15);
Car c2 = new Car(1.5, 5);
System.out.println(c2.getCapacity2( ));
```

Referring to the portion of the obfuscated program shown in Table 4, it is difficult to determine the actual types of the two cars. Note that the value 2.3 passed to the constructor for object $c_1$ and the value 5 passed to the constructor for object $c_2$ are themselves obfuscated in the sense that they are not used by the program. The program can be made even more incomprehensible by scrambling names used for classes, names, and fields. Table 5 lists a portion of the program where the name of class Car is replaced with name C and the names of all fields and methods of Car are replaced with generic names (the capability of object-oriented languages to use the same name for a number of different methods if these methods require different numbers and/or types of parameters may be used.

TABLE 5

```
class C {
    private int a;
    private Person b;
    private double c;
    private int d;
    public C(double a1, int a2) {...}
    public Person a( ) {...}
    public void a(Person a) {...}
    public int b( ) {...}
    public double e( ) {...}
    public void a(int c) {...}
}
```

The examples described above represent simple examples of class coalescence; however, object-oriented languages often have contract-like representations of types. For example, Java has interfaces that are used to specify types without giving full definitions of methods included in these types. Multiple classes may implement the same interface, so that the program that uses objects of the interface type can flexibly change from one implementation of the interface to another. In an exemplary embodiment of the present invention, interfaces are deleted from the obfuscated program wherever possible. There are two primary reasons for deleting the interfaces. First, doing so further obfuscates the program, since conceptually, interfaces are specifications of intent on a higher level than classes. Second, in certain situations, coalescing classes makes the use of interfaces unnecessary. For example, consider the fragment of Java code listed in Table 6.

TABLE 6

```
interface CarInterface {
    int getId( );
}
class Truck implements CarInterface {
    public int getId( ) {...}
    ...
}
class Bus implements CarInterface {
    public int getId( ) {...}
    ...
}
```

Suppose that the code using these definitions creates an array of 10 objects of type CarInterface and calls their getId method (note that this is possible because interface CarInterface makes a contractual obligation that all classes implementing it will provide the getId method). An example of such an array is illustrated in Table 7.

TABLE 7

```
CarInterface [ ] cars = new CarInterface[10];
// Assume that array cars is populated with objects of types Truck and Bus
for (int j=0; j < cars.length; j++) {
    System.out.println(car[j].getId( ));
}
```

Since array cars contains objects of both types Truck and Bus, it cannot be an array of type Truck or Bus. However, if classes Truck and Bus are coalesced to form class Car, the array cars could be of type Car, making it possible to remove interface CarInterface, while keeping the program functionally the same.

The exemplary obfuscation techniques described herein may change the visibility modifiers of classes, fields, and methods, as well as their locations in libraries. For example, in Java, if a class C is declared private to a package, it typically may not be referenced outside of the package. Coalescing this class with another class from this or another package that is visible outside of this package effectively makes class C visible outside of its package. Generally, such changes to the package structure of the program further obfuscate the program, removing the logical boundaries created by packages and libraries. Implementations of the technique may remove all packages shipped with the program, except possibly those packages that are intended to be used outside of the scope of the program. For example, a Java application may ship with a library of JavaBeans, with the intent that these components may be included by buyers in their own applications. The obfuscating techniques would not remove such a library.

The application of the exemplary obfuscation techniques described herein typically do not affect functional characteristics of programs, but may affect the use of resources. In certain exemplary embodiments, the obfuscation techniques increase the speed of programs, but at the same time may increase memory usage. The reason for the speed-up is the elimination of parts of the program inheritance hierarchy. In the example above, application of the technique removed inheritance of class AbstractCar by classes PersonalCar, Truck, and Bus. This modification streamlines patterns of method calls made in the program and eliminates dynamic dispatch, leading to faster execution of method calls. The corresponding increase in memory use is because the number of objects that the program allocates and uses does not change, but each object has more fields. In the example above, if the original program allocated one object of each PersonalCar, Truck, and Bus, among these three objects there would be three integer fields to represent car IDs, one field of type Person to represent the owner of the personal car, one field of type double to represent the load capacity of the truck, and one integer field to represent the capacity of the bus, for a total of six fields. The obfuscated version of this program would have three objects of type Car, each having the four fields defined for this type, for the total of 12 fields. Depending on the operational profile of the program, a significant increase in memory usage may adversely affect execution time of the program, for example, if many of the program objects are short-lived. As such, the time used to create objects may be a large portion of the overall run-time of the program.

In various exemplary embodiments of the present invention, it is desirable that certain modifications of the original program be acceptable in the obfuscated program. For example, class, method, and field visibility modifiers may be changed, but in a way that it does not affect the functionality of the classes. Additionally, member (inner) classes may be converted into a top-level classes.

These types of modifications, for example, may compromise the application-level security. As such, the user of the obfuscation tool may identify security-sensitive classes in the program being obfuscated. If such security-sensitive classes are selected for coalescing, the tool may first determine if there is a chance that security features of these classes will be compromised. The results of this analysis are presented to the user who makes the final decision about whether to perform coalescing of these security-sensitive classes.

Application of the obfuscation techniques described herein may affect only variables of reference types. For simplicity of presentation, we may place several restrictions on the types of statements that can involve such variables. In an exemplary embodiment, it may be required that calls to methods and accesses of fields of objects and classes (class fields are static fields) are not used in expressions. Therefore, the only use of fields involves assigning a field value to a variable. The only two types of method calls are call statements for methods that do not return values and assignments of the return value of a method to a variable. Additionally, it may be required that the only assignments to fields of objects and classes are of the form o.f=v, where o is an object or a class, f is a field, and v is a variable. Note that these restrictions do not reduce the generality of the obfuscation approach.

Several kinds of statements may be used in object-oriented programs. For example, call statements represent method calls. Return statements return control and possibly values from statements. Reference manipulation statements are all statements that are neither call, nor return statements, and involve access or modification of fields of classes or objects. The terms call, return, and reference are used to identify types of statements. In addition, other statements are used that do not represent call statements, are not return statements, and do not manipulate references.

As described below, in an exemplary embodiment of the present invention, a map $\mu$ is defined that represents the correspondence between the original program P and the obfuscated program P'.

In Java, program variables and object and class fields have types. Programmers can define new types by creating classes or interfaces. Interfaces declare methods and constants; classes implement methods and define fields. A class may implement one or more interfaces. In such a case, the class may provide implementations for all methods declared in these interfaces (this may not be the case for abstract classes). Let functions Types, Classes, and Interfaces return respectively sets of types, classes, and interfaces in the given program. By definition, for a program P, Types(P)=Classes(P)∪Interfaces(P) and Classes(P)∩Interfaces(P)=∅.

Let functions Methods and Fields return respectively sets of methods and fields in the given class or interface (typically all fields of an interface are constant). Let function Statements return the set of all statements in a given method. Let function Objects return the set of dynamically allocated objects in the given program and let function Variables return the set of local variables in the given program. Objects includes a special object cl for each c∈Classes(p), representing the static members of class c. We overload functions Methods, Fields, and Statements to return respectively sets of methods, fields, and statements in a given program.

Function name returns the name of the given method or field: name: Methods(P)∪Fields(P)→String. Function class returns the class to which the given object, field, or method belongs: class: Objects(P)∪Fields(P)∪Methods(P)→Classes(P). Function returnType returns the return type of the given method. Function signature maps a method to a list of the types of its parameters: signature: Methods(P)→Types*(P). Function used returns a set of statements where a given method or field is used, taking scope into consideration: used: Methods(P)∪Fields(P)→$2^{Statements(P)}$. Function kind returns the kind of a given statement: kind: Statements(P)→{call, return, reference, other}.

It is typically important that the functionality of the obfuscated program be identical to that of the original program. A program trace is a sequence of statements executed on a terminal or partial run of the program. A program trace is denoted by listing statements in this trace, in the order they are executed. Function Traces returns the set of program traces, for all possible inputs. Function trace returns the trace for a program on a specified input, after the specified number of steps.

In an exemplary embodiment of the present invention, the mapping $\mu$: P→P' is defined in a way that satisfies the properties listed in Table 8.

TABLE 8

$t \in \Rightarrow$ Types(P) $\Rightarrow \mu(t) \in$ Types(P');
$c \in$ Classes(P) $\Rightarrow \mu(c) \in$ Classes(P');
$c \in$ Classes(P) $\wedge$ f $\in$ Fields(c) $\Rightarrow \mu$ (f) $\in$ Fields($\mu(c)$), so that type($\mu(f)$) = $\mu$(type(f));
$c \in$ Classes(P)$\wedge$m $\in$ Methods(c) $\Rightarrow \mu(m) \in$ Methods($\mu(c)$), so that, t = returnType(m)$\Rightarrow \mu$ (t) = returnType($\mu(m)$);
$o \in$ Objects(P) $\Rightarrow \mu(o) \in$ Objects(P'), so that class($\mu(o)$) = $\mu$(class(o));
$c \in$ Classes(P) $\wedge$m $\in$ Methods(c) $\wedge$ s $\in$ Statements(m) $\Rightarrow \mu(s) \in$ Statements($\mu(m)$), so that $\forall o \in$ used(s); $\mu(o) \in$ used($\mu(s)$) and kind(s) = kind($\mu(s)$).
For any program input I, $\forall k > 0$, let trace(P, I, k) = $s_1, \ldots, s_k$. Then $\mu$(trace(P, I, k))|$\mu$(Statements(P)) = $\mu(s_1), \ldots, \mu(s_k)$, where t/s represents projection of trace t on the set of statements S and $\mu$ (Statements(P)) represents the set of all statements in P' to which statements from P are mapped.

Functions Fields and Methods are overloaded to return the set of fields and methods of a specific object. Function value is used to represent the value of a given field or variable at a specific point at runtime, i.e., value(f, $s_1, \ldots s_k$) represents the value of field f after execution of statements $s_1, \ldots, s_k$. Values of fields of variables of reference types are combinations of values of their fields. In defining an exemplary obfuscation technique, it is not necessary to determine the exact values of variables and fields, but rather it may be helpful to determine if two given variables or fields have the same values. The recursive definition listed in Table 9 describes equality of values of variables and fields.

TABLE 9 value($v_1,t_1$) = value($v_2, t_2$) if
    $v_1, v_2$ are of primitive types and have identical values after traces $t_1, t_2$
    $v_1, v_2$ are of the same reference type c and $\forall f \in$ Fields(c), value($v_1.f, t_1$) = value($v_2.f, t_2$)
where v.f represents access of field f of object v.

Let implements be a function that, for a given class c, returns all interfaces that c implements. In Java, a class may implement zero, one, or any number of interfaces. Let extends be a function that, for a given class c, returns the superclass of c. In Java, a user-defined class always extends a single other class (java.lang.Object by default). Class C' overrides method m of class C if C' directly or indirectly extends C and replaces the implementation of m in C with an alternative implementation. Function overrides returns the set of methods inherited by the given class that this class overrides.

Programs $P_1$ and $P_2$ are functionally equivalent if the user (whether a human user or a dependent program) is not capable of detecting a difference in the functionality of $P_1$ and $P_2$ (non-functional behaviors of $P_1$ and $P_2$, e.g. time and space requirements, may differ). We define user access to be access of a value of an object of a field or class or of a local variable. Two programs are functionally equivalent if matching user accesses return the same values.

In an exemplary embodiment of the present invention, programs $P_1$ and $P_2$ are strongly dynamically functionally equivalent if the relations listed in Table 10 are satisfied.

TABLE 10

$\forall t \in \text{Traces}(P), \forall o \in \text{Objects}(P_1), \forall f \in \text{Fields}(o), \text{value}(f, t) = \text{value}(\mu(f), \mu(t))$
 $\forall v \in \text{Variables}(P_1), \text{value}(v, t) = \text{value}(\mu(v), \mu(t))$  (1)

It has been determined that if programs $P_1$ and $P_2$ are strongly dynamically functionally equivalent and externally visible components of $P_1$ and $P_2$ are related by mapping, then $P_1$ and $P_2$ are functionally equivalent.

External observers of $P_1$ and $P_2$ may observe the functional behaviors of these programs by accessing fields and calling methods of objects and accessing values of method-local variables of primitive types. Because the externally visible components of $P_1$ and $P_2$ are related by mapping, if an external observer of $P_1$ accesses some field f of an object o, then the external observer of $P_2$ accesses field $\mu(f)$ of object $\mu(o)$. According to the definition of strong dynamic functional equivalence, values of f and $\mu(f)$ are the same at mapped points of access (statements).

Suppose that the external observer of $P_1$ calls a method m of object o. Then the external observer of $P_2$ calls a method $\mu(m)$ of object $\mu(o)$. Let s be any return statement in m. Then $\mu(s)$ is a return statement in $\mu(m)$. Since the right-hand sides of s and $\mu(s)$ are the same with the exception of mapped objects, s and $\mu(s)$ return the same value. Therefore, external behaviors of calls to s and $\mu(s)$ are the same.

Suppose that the external observer of $P_1$ accesses a local variable v in statement $s_1$ of a primitive type in method m called for object o. Let $s_2$ be any of the assignment statements that define v, so that this definition reaches $s_1$. According to the definition of mapping $\mu$ between statements, statement $\mu(s_2)$ assigns the same value to v as $s_2$ does. Also, because none of the statements in $\mu(m)$ that is not mapped to a statement in m assigns a value to a variable or objects in P and the mapping of statements preserves control flow, the definition of v in $\mu(s_2)$ reaches statement $\mu(s_1)$. Therefore, the value of v accessed by the external observer of $P_2$ in statement $\mu(s_1)$ is the same as that accessed by the external observer of $P_1$ in statement $s_1$.

In the embodiments described herein, the term simple describes a class c that satisfies each of the following five statements:

1. c is not an inner class.
2. c is not an abstract class.
3. c does not extend any classes except the java.lang.Object: extends(c)=java.lang.Object.
4. c does not implement any interfaces: implements(c)=∅.
5. c does not override the methods defined in java.lang.Object: overrides(c)=∅.

Any class for which at least one of these restrictions does not hold is complex. A basic coalescence algorithm coalesces two simple classes. Later in this application, the basic coalescence algorithm is extended to coalesce complex classes.

Figure 2:
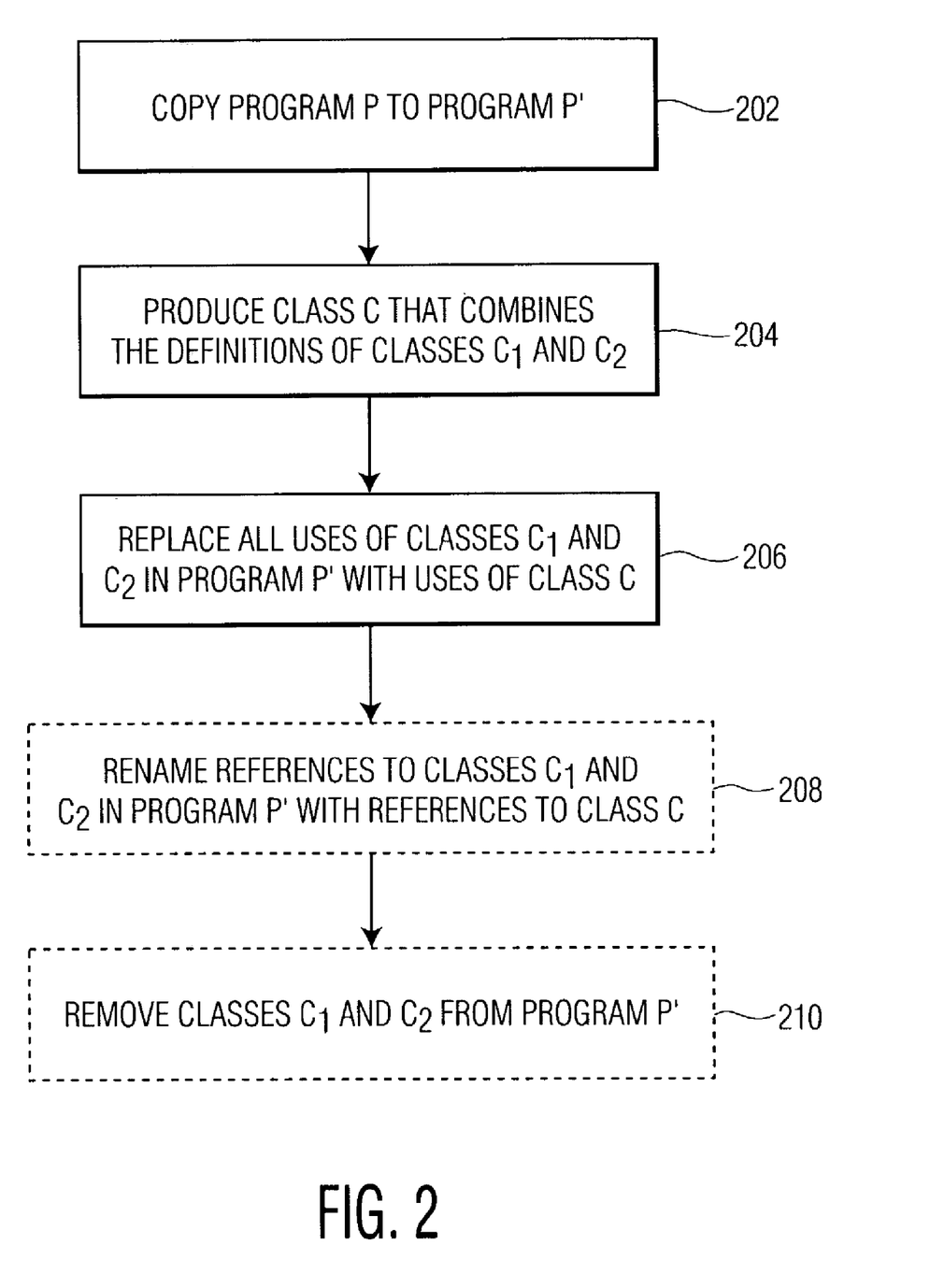
FIG. 2 is another flow chart diagram which is useful for describing an exemplary embodiment of the present invention.

FIG. 2 is a flow chart that illustrates another exemplary method of obfuscating an object-oriented program that relates to the basic coalescence algorithm. At step 202, a program P is copied, and the copied program is P'. At step 204, a class c is produced in P' that combines the definitions of classes $c_1$ and $c_2$. At step 206, all uses of classes $c_1$ and $c_2$ in P' are replaced with corresponding uses of class C. At optional step 208, references to classes $c_1$ and $c_2$ are replaced with references to class c. At optional step 210, classes $c_1$ and $c_2$ are removed from program P'.

Figure 3:
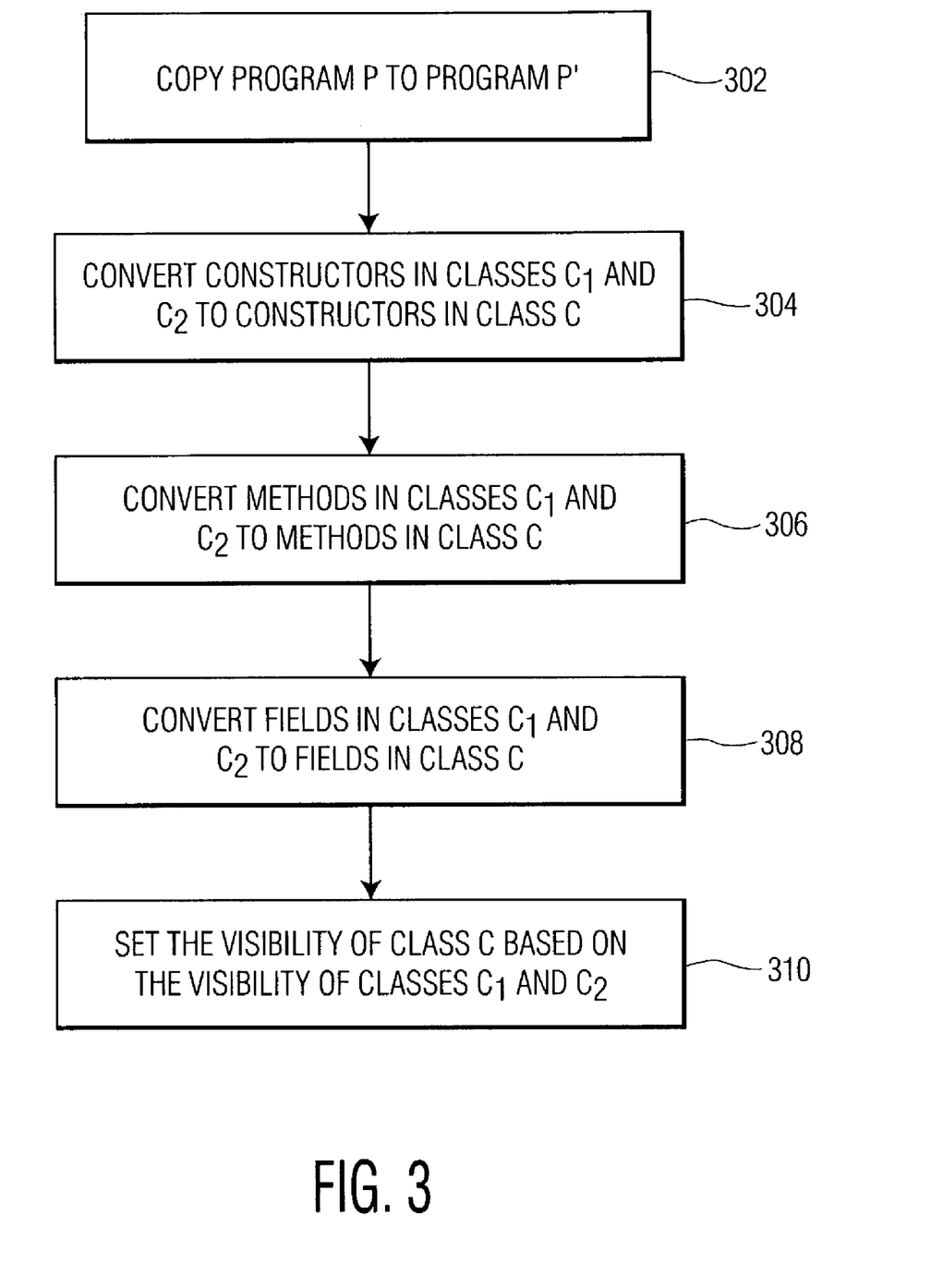
FIG. 3 is yet another flow chart diagram which is useful for describing an exemplary embodiment of the present invention.

FIG. 3 is a flow chart that illustrates yet another exemplary method of obfuscating an object-oriented program. At step 302, a program P is copied, and the copied program is P'. At step 304, in program P', constructors in classes $c_1$ and $c_2$ are converted to constructors in class c. At step 306, in program P', methods in classes $c_1$ and $c_2$ are converted to methods in class c. At step 308, in program P', fields in classes $c_1$ and $c_2$ are converted to fields in class c. At step 310, the visibility of class c is set based on the visibility of classes $c_1$ and $c_2$.

An exemplary embodiment of the basic coalescence algorithm is described in further detail by reference to Tables 11–18. The algorithm proceeds in several stages, as shown in Table 11. As described above, program P is copied to program P'. Then a class c that combines the definitions of classes $c_1$ and $c_2$ is produced. Finally, all uses of classes $c_1$ and $c_2$ in program P' are replaced with uses of class c. Merging of two classes $c_1$ and $c_2$ to obtain class c is described in Tables 12–17. Tables 13–14 describe merging constructors and methods of $c_1$ and $c_2$ into c. In case there are constructors $m_1 \in \text{Methods}(c_1)$ and $m_2 \in \text{Methods}(c_2)$ with identical signatures, function convertConstructors adds an extraneous parameter to one of these constructors to change it's signature. The mapping between the original constructor and the modified constructor is added to $\mu$. This mapping later (in function rename in Table 18) is used to ensure that the calls to this constructor are modified accordingly. In case there are methods $m_1 \in \text{Methods}(c_1)$ and $M_2 \sqcup \text{Methods}(c_2)$ with the same names and identical signatures, function convertMethods renames one of $m_1$ and $m_2$. Function convertFields in Table 15 merges fields of classes $c_1$ and $c_2$. If two fields $f_1 \in \text{Fields}(c_1)$ and $f_2 \in \text{Fields}(c_2)$ have the same names, one of these two fields are renamed in c. Similar to methods, a mapping between the original field and the renamed field is preserved, so that all accesses of the original field can later (in function rename in Table 18) be replaced with accesses of the renamed field. Note that the convertConstructors, convertMethods, and convertFields functions do not change the modifiers of the constructors, methods, and fields that are transformed before adding them to the resulting class c.

The visibility modifier of the new class c depends on the visibility modifiers of classes $c_1$ and $c_2$. Similarly, the choice of the package in which c is placed depends on the packages to which classes $c_1$ and $c_2$ belong. In Java, the visibility of the class falls into one of four categories: public classes are accessible from anywhere in their program; classes with package access are accessible from any class or interface in the same package, but not from outside of this package; protected classes are accessible from any class or interface in the same package or classes that extend them, even if these classes are in other packages; finally, private classes are not accessible from other classes or interfaces (private classes are normally inner classes). A lattice with elements {public, protected, package, private} is defined with the following partial order: public ⊐protected ⊐package ⊐private. The join operation ⊔ is defined in the usual lattice-theoretic way. For example, public ⊔ package=public.

Function setVisibility in Table 16 computes the visibility modifier for class c, by applying the join operation to the visibility modifiers for classes $c_1$ and $c_2$. In addition, this function assigns c to a package and merges packages of $c_1$ and $c_2$, if necessary. Function mergePackage in Table 17 combines all interfaces and classes in the packages being merged into the resulting package (it is assumed that $c_1$ and $c_2$ are not inner classes, and so their visibility modifiers cannot have value private).

After class c that represents the combination of classes $c_1$ and $c_2$ is produced, function rename in Table 18 replaces references to classes $c_1$ and $c_2$ in program P' with references to class c. This function changes types of fields, local variables, and parameters and return types of methods. In addition, if constructors, methods, or fields have been renamed, this function uses these new names in the references made to these constructors, methods, and fields in P'.

TABLE 11

Input: A program P and two classes $c_1, c_2 \in$ Classes(P).
Output: A program P' that is functionally equivalent to P, where Classes(P') = Classes(P) $\cup$ c \ $\{c_1, c_2\}$.
(1) Copy P → P'
(2) c = merge($c_1, c_2$) (Table 12)
(3) rename(P', $c_1$, c) (Table 18)
(4) rename(P', $c_2$, c)
(5) remove $c_1$ and $c_2$ from P'

TABLE 12

Input: Classes $c_1$ and $c_2$ satisfying the requirements in the beginning of this section.
Output: A class c such for each field/method in $c_1$, c contains a corresponding field/method and for each field/method in $c_2$, c contains a corresponding field/method.
(1) convertConstructors($c_1$, c) (Table 13)
(2) convertConstructors($c_2$, c)
(3) convertMethods($c_1$, c) (Table 14)
(4) convertMethods($c_2$, c)
(5) convertFields($c_1$, c) (Table 15)
(6) convertFields($c_2$, c)
(7) setVisibility($c_1, c_2$, c) (Table 16)

TABLE 13

Input: Classes $c_1$ and c.
Action: For each constructor in $c_1$, creates a corresponding constructor in c.
(1) For each constructor m in $c_1$
(2) while c has a constructor m' such that signature(m') = signature(m)
(3)     add a parameter of an arbitrary type to signature(m)
(4) add m to c, without changing the body of m in any way
(5) set the mapping μ between m in $c_1$ and m in c

TABLE 14

Input: Classes $c_1$ and c.
Action: For each method in $c_1$, creates a corresponding method in c.
(1) For each method m in $c_1$
(2) if c has a method m' such that name(m') = name(m) $\wedge$ signature(m') = signature(m)
(3)     change name(m), so that $\forall m' \in$ Methods(c), name(m) $\neq$ name(m')$\vee$signature(m) $\neq$ signature(m')
(4) set the mapping μ between m in $c_1$ and m in c

TABLE 15

Input: Classes $c_1$ and c.
Action: For each field in $c_1$, creates a corresponding field in c.
(1) For each field f in $c_1$
(2) if c has a field f' such that name(f') = name(f)
(3)     change name(f), so that $\forall f' \in$ Fields(c), name(f) $\neq$ name(f')
(4) set the mapping μ between f in $c_1$ and f in c

TABLE 16

Input: Classes $c_1, c_2$, and c.
Action: Assigns visibility modifiers and package to class c based on the visibility modifiers and packages of $c_1$ and $c_2$.
(1) Set visibility(c) = visibility($c_1$) $\sqcap$ visibility($c_2$)
(2) if visibility(c) = public
(3)     arbitrarily assign package(c) to be either package($c_1$) or package($c_2$)
    else
(4) newPac = mergePackage(package($c_1$), package($c_2$)) (FIG. 7)
(5) package(c) = newPac

TABLE 17

Input: Packages $p_1$ and $p_2$.
Output: A package p that includes all classes and interfaces in packages $p_1$ and $p_2$ (and therefore replaces $p_1$ and $p_2$).
(1) initialize p to be an empty package
(2) for each class or interface c in $p_1$
(3)     change the package of c to p
(4) if $p_1 \neq p_2$
(5)     for each class or interface c in $p_2$
(6)         if p contains a class or interface with name of c
(7)             rename c, so that $\forall c' \in$ p, name(c) $\neq$ name(c')
(8)         change the package of c to p

TABLE 18

Input: Program P' and classes $c_1$ and c, such that c $\in$ Classes(P') $\wedge \mu(c_1)$ = c.
Action: Replaces in P' every access to fields/methods of $c_1$ with accesses to the corresponding fields/methods of c.
(1) for each $c_2 \in$ Classes(P')
(2)     for each f $\in$ Fields($c_2$)
(3)         if type(f) = $c_1$, change it to c
(4)     for each m $\in$ Methods($c_2$)
(5)         for each parameter or return type p of m
(6)             if type(p) = $c_1$, change it to c
(7)         for each s $\in$ Statements(m)
(8)             if s declares a variable v of type $c_1$
(9)                 make the type of v in this declaration c
(10)            if s accesses a field f of object o
(11)                replace this access with a corresponding access of field μ(f) of this object
(12)            if s calls a method m of object o
(13)                replace this call with a call to method μ(m)
(14)                if method μ(m) requires additional parameters, generate arbitrary values of the required types and use them as parameters of this object The inventors have determined that mapping μ maps a method m from program P to method m' from program P', it also maps each statement from m to some statement of m'.

For any program P and any two basic classes $c_1$, $c_2 \in$ Classes(P), if the basic algorithm is used to replace $c_1$ and $c_2$ with class c, resulting in a program P', then P' is dynamically strongly functionally equivalent to P. This may be shown using the following statement, hereinafter referred to as statement (2).

After execution of statements $s_1, \ldots, s_k$ in P and $\mu(s_1), \ldots, \mu(s_k)$ in P', $\forall o \in$ Objects(P, $s_1, \ldots, s_k$), value(o, $s_1, \ldots, s_k$)=value($\mu(o), \mu(s_1), \ldots, \mu(s_k)$) and $\forall v \in$ Variables (P, $s_k$), value(v, $s_1, \ldots, s_k$)=value($\mu(v), \mu(s_1), \ldots, \mu(s_k)$)

Statement (2) may be proven by induction on the number of statements in the execution trace of P. Consider the states of P and P' before any statements are executed. According to an exemplary model of program execution, no objects are created and no variables are initialized in the programs at this state.

Suppose that statement (2) holds for sequences of statements of length less than k, where k is an arbitrary constant. It is proven below that this statement holds for any sequence of statements of length k.

Several types of cases are herein considered based on the type of statement $s_k$. First, assume that $s_k$ is in the same method as $s_{k-1}$. Then $\mu(s_k)$ is in the same method as $\mu(s_{k-1})$, according to lemma 2.

Let $s_k$ be a statement creating an object o. Then $\mu(s_k)$ also creates an object, $\mu(o)$. If type(o)$\notin \{c_1, c_2\}$, then type($\mu(o)$)=type(o) and $\mu(o)$ has fields of the same types as the fields of o. Therefore, corresponding fields of o and $\mu(o)$ are assigned the same initial values. Because statements $s_k$ and $\mu(s_k)$ do not change values of any program variables or fields of any objects in P and P' respectively, statement (2) holds for this case.

If type(o)$\in \{c_1, c_2\}$, then type($\mu(o)$)=c and for any field f$\in$Fields(o), there exists a field $\mu(f) \in$Fields($\mu(o)$). Similar to the case considered in the previous paragraph, it can be concluded that statement (2) holds.

Now suppose that statement $s_k$ modifies a field f of object o. In the limited notation for expressions, the assignment is some local variable v: o.f=v. Statement $\mu(s_k)$ assigns the value of variable $\mu(v)$ to the field $\mu(f)$ of $\mu(o)$. By the inductive hypothesis, value(v, $s_1, \ldots, s_k$)=value($\mu(v), \mu(s_1), \ldots, \mu(s_k)$). Thus, fields f and $\mu(f)$ have the same values and statement (2) holds.

Suppose that $s_k$ assigns a value to a variable v. Let r be the right-hand sign of this assignment statement. Statement $\mu(s_k)$ assigns a value to a variable $\mu(v)$. According to the definition of mapping of statements, the expression structure is preserved. The algorithm replaces parts of expression r with their images using mapping μ. Therefore, by the induction hypothesis, value(v, $s_1, \ldots, s_k$)=value($\mu(v), \mu(s_1), \ldots, \mu(s_k)$) and statement (2) holds.

Now assume that $s_k$ and $s_{k-1}$ are in two different methods. There are two cases to be considered. First, it is possible that $s_k$ is the first statement in method o.m called immediately after statement $s_{k-1}$ was executed. According to the mapping of method calls, $\mu(s_k)$ is the first statement in method $\mu(o).\mu(m)$. The cases based on the type of statement $s_k$ are proved in the same way as for the situation where $s_k$ and $s_{k-1}$ are in the same method.

It is also possible that $s_{k-1}$ is the last statement executed in method o.m and $s_k$ is the method call statement for o.m. The situation where method m does not return a value is trivial, because in this case $s_k$ does not change any objects or variables. If m returns a value, by the induction hypothesis, o.m and $\mu(o).\mu(m)$ return the same value. The cases based on the type of the assignment statement in $s_k$ are proved in the same way as for the situation where $s_k$ and $s_{k-1}$ are in the same method.

The restrictions on the type of classes that can be handled by the basic coalescence algorithm are often quite limiting. To apply the obfuscation techniques to real-world programs, various restrictions should be relaxed. A limitation of an exemplary embodiment of the basic algorithm is that the transformations applied to the original program in some cases may be easily detected by automated reverse engineering tools. For example, a reverse engineering tool based on dependency analysis, given a class in the obfuscated program, may be able to detect that all fields and methods in this class can be separated into two sets, with no dependency across the sets. This indicates that it is likely that the class is a result of coalescence of the two classes that correspond to the two sets. The term obfuscation strength refers to the degree of resilience of the obfuscated program to such attacks. The obfuscation strength of the basic algorithm can be significantly improved. Extensions of the basic algorithm directed at improving generality and strength of the various obfuscation techniques are described below.

Java supports the notion of inner classes, which are classes that are defined as members of other, containing, classes. Non-inner classes are commonly referred to as top-level classes. There are several important differences between inner and top-level classes. First, inner classes can access other members of their containing classes, even if these members have private visibility. Second, inner classes can have limited visibility within their containing class. For example, an inner class can only be visible inside one method in its containing class. Such inner classes are called local. Finally, non-static inner classes are associated with instances of their containing classes (in a sense, inner classes for different instances of a containing class represent different types).

The Java class file format does not contain special provisions for inner classes. Therefore, Java compilers convert inner classes into top-level classes and then produce regular top-level byte-codes for these classes. Transformations involved in this conversion include adding special fields to inner classes that hold references to their containing classes and changing visibility modifiers of fields of the containing classes. Therefore, implementations of class coalescing should either perform similar transformations or work directly with byte-codes, where all classes are top-level. The latter approach is typically employed in the coalescing approach described herein.

In Java, abstract classes may leave out implementations of some methods. Implementation of these methods is left to subclasses of abstract classes. As a result, abstract classes cannot be instantiated. Non-abstract classes are referred to as concrete.

If both classes to be coalesced, $c_1$ and $c_2$, are abstract, the resulting class, c, can be converted to an abstract class. For generality, however, abstract classes should typically be converted into concrete classes and the class coalescence may then be performed.

Let $c_1$ be an abstract class that is to be coalesced with class $c_2$. Class $c_1$ is replaced with a concrete class $c'_1$ by giving default implementations to all abstract methods in $c_1$. A trivial default implementation for methods that do not return a value is to not have any statements in the body of the method. A trivial default implementation for methods returning a value is to return a default value for the required type (e.g. null for a reference type). In practice, non-trivial implementations may be required, to make it more difficult for reverse engineers to detect the possibility that this type of obfuscation had been applied. Table 19 provides an algorithm for replacing abstract classes with concrete classes.

TABLE 19

Input: A program P and abstract class c ∈ Classes(P).
Output: A program P' that is functionally equivalent to P, where Classes(P') = Classes(P)∪c'\{c},
where c' is a concrete class.
(1) Copy all concrete methods from c to c'
(2) For each abstract method m ∈ Methods(c):
(3)    Create a concrete method m' ∈ Methods(c') : name(m') = name(m)∧ signature(m') = signature(m) ∧ returnType(m') = returnType(m)
(4) If returnType(m) ≠ void
(5)    Add statement return (default value for returnType(m)) to the body of m
    else
(6)    Leave the body of m empty It has been determined that if c is be an abstract class in program P, replacing c with a concrete class c', using the algorithm in Table 11, transforms P into a functionally equivalent program P'.

It is proven below that P and P' are strongly dynamically functionally equivalent by induction on the length of traces in P. Since c is an abstract class, no objects of class c are created in P. First, consider a trace of length 0 in P, mapping to a trace of length 0 in P'. Before executing any statements in P, no objects are created and no variables and class fields initialized. Therefore, equation (1) in the definition of strong dynamic functional equivalence holds trivially.

Assume that equation (1) holds for a trace of P of length $k-1$, $k \geq 1$. Consider any trace $t_k$ of P of length k. Trace $t_k$ can be represented as $t_k = t_{k-1}, s_k$, where $t_{k-1}$ is a trace of length $k-1$ and $s_k$ is the last statement in $t_k$. Several cases are considered based on the kind of statement $s_k$.

First, let $s_k$ be a constructor call for class $c_0$ that generates an object o. Because the fields of o are not initialized, equation (1) holds by the induction hypothesis.

As indicated below, various situations are considered where one or both of classes $c_1$ and $c_2$ that are coalesced implement interfaces. Various exemplary situations are informally described, followed by a general algorithm for coalescing classes that implement interfaces.

Suppose that one of $c_1$, $c_2$ implements interfaces and the other does not. Let implements($c_1$)≠∅ and implements($c_2$)=∅. The basic coalescence algorithm is used on $c_1$ and $c_2$ in such a way that no methods of $c_1$ are renamed, only methods of $c_2$. This restriction prevents renaming methods from implements($c_1$) that $c_1$ implements. For the resulting class c, implements(c)=implements($c_1$).

Now suppose that $c_1$ and $c_2$ implement disjoint sets of interfaces. Let implements($c_1$)∩implements($c_2$)=∅. Consider two situations. First, assume that all methods declared by interfaces in sets implements($c_1$) and implements($c_2$) are different. In this case, those methods in $c_1$ and $c_2$ that implement methods from implements($c_1$) and implements ($c_2$) respectively are not renamed. The basic coalescence algorithm is applied to $c_1$ and $c_2$, obtaining class c, and set implements(c)=implements($c_1$)∪implements($c_2$).

Now suppose that ∃$i_1$∈implements($c_1$), $i_2$∈implements ($c_2$), such that method m is declared in both interfaces $i_1$ and $i_2$. Before coalescing, method m is renamed in $i_2$, $c_2$, and all other classes that directly or indirectly implement $i_2$. After all such methods are renamed, all methods declared by interfaces in sets implements($c_1$) and implements($c_2$) are different, thereby reducing this situation to the previous situation.

Now suppose that $c_1$ and $c_2$ implement the same interfaces. Consider the situation where implements($c_1$)=implements($c_2$)≠∅. Classes $c_1$ and $c_2$ provide different implementations for each method in the implemented interfaces. The difficulty of this situation is the potential for the use of dynamic binding, where it may not be known until the run-time whether the called method is defined in $c_1$ or $c_2$. Therefore, we cannot statically rename methods in some of the interfaces to accommodate a class coalescing approach. To coalesce classes $c_1$ and $c_2$ in this situation, a state variable approach is used. In such a situation, a field is added to class c that identifies whether a given object of this class in program P' maps to an object of class $c_1$ or class $c_2$ in program P. This variable is set to state "former $c_1$," in all constructors mapped to constructors of $c_1$ and to state "former $c_2$," in all constructors mapped to constructors of $c_2$ (the type of this state variable is intentionally not fixed, since there are infinitely many ways to represent this information, the choice to the implementation of the class coalescing tool is left open). State(c) is used for the state variable of a class c. State(o)=$c_1$ is written if the state variable of object o represents the fact that the object from the original program P mapped to o has concrete type $c_1$.

Classes $c_1$ and $c_2$ are merged using the basic coalescence algorithm, to obtain class c, except for methods declared in interfaces from implements($c_1$). Coalescing for such methods is shown in Table 20.

TABLE 20

Input: Methods $m_1$ ∈ Methods($c_1$), $m_2$ ∈ Methods($c_2$), such that name($m_1$) = name($m_2$) ∧ signature($m_1$) = signature($m_2$).
Class c coalescing $c_1$ and $c_2$, with a state variable state.
Output: A method m ∈ Methods(c) representing coalescing of $m_1$ and $m_2$.
(1) set name(m) = name($m_1$)
(2) set signature(m) = signature($m_1$)
(3) set return Type(m) = μ(returnType($m_1$))
(3) insert the following if statement in the beginning of m:
    if state(this) == $c_1$
(4) copy the body of $m_1$ in the true clause of the if statement
(5) copy the body of $m_2$ in the false clause of the if statement A general case of implementing interfaces is now described. Table 21 shows the algorithm for coalescing classes $c_1$ and $c_2$ that may implement interfaces into a class c, so that implements(c)=implements($c_1$)∪implements($c_2$). This algorithm relies on the basic algorithm from Table 11 to coalesce $c_1$ and $c_2$, except for those methods that have the same names and signatures in $c_1$ and $c_2$ and appear in interfaces implemented by $c_1$ and an interface implemented by $c_2$. Such methods $m_1$ and $m_2$ are merged into a single method m∈Methods(c) by the algorithm in Table 20. In addition, a state variable state is created for c and the value of this variable is initialized in all constructors of c. The value of state signifies whether an object of class c in program P' corresponds to a project of class $c_1$ or class $c_2$ in program P'.

In an exemplary embodiment, the present invention shows that coalescing $c_1$ and $c_2$ that may implement interfaces, but extend only java.lang.Object into c, where implements(c)=implements($c_1$)∪implements($c_2$), using algorithm in Table 21, transforms P into a functionally equivalent program P'.

Below, various possible situations where classes $c_1$ and $c_2$, that are to be coalesced participate in inheritance relationships, are described. For example, extends($c_1$)=extends ($c_2$)=$c_3$ and $c_1$ and/or $c_2$ do not override methods from $c_3$ or any superclasses of $c_3$.

If $c_1$ and $c_2$ do not implement any interfaces, classes $c_1$ and $c_2$ are coalesced using the basic algorithm. In case $c_1$ and/or $c_2$ implement interfaces, classes $c_1$ and $c_2$ may be coalesced using the algorithm in Table 21. For the resulting class c, extends(c)=$c_3$.

TABLE 21

Input: A program P and two classes $c_1$, $c_2$ ∈ Classes(P).
Output: A program P' that is functionally equivalent to P,
where Classes(P') Classes(P) ∪ c \
{$c_1$, $c_2$} and implements(c) = implements($c_1$) ∪ implements($c_2$).
(1) ∀$i_1$ ∈ implements($c_1$), ∀$i_2$ ∈ implements($c_2$):
(2)   if ∃$m_1$ ∈ Methods($i_1$), ∃$m_2$ ∈ Methods($i_2$) : name($m_1$) = name($m_2$)∧
      signature($m_1$) = signature($m_2$) ∧ μ(returnType($m_1$)) =
      μ(returnType($m_2$)):
(3)       add method mergeMethods($m_1$, $m_2$) to c (Table 20)
(4)       remove $m_1$ from $c_1$ and $m_2$ from $c_2$
(5) Run the basic algorithm on $c_1$, $c_2$, and c (Table 11)
(6) Create state variable state for c
(7) For each constructor m ∈ Methods(c),
(8)   call initializeState(state, m) (Table 22)

TABLE 22

Input: State variable state for class c, obtained after coalescing
classes $c_1$ and $c_2$ and a constructor m ∈ Methods(c)
Action: Initialization of state in m.
(1) if there exists a constructor $m_1$ ∈ Methods($c_1$), μ($m_1$) = m:
(2)   create a statement that sets state to be $c_1$
      else (3) create a statement that sets state to be $c_2$
(4) insert the created statement anywhere in the body of m In another exemplary embodiment, extends($c_1$)=extends($c_2$)=$c_3$ and $c_1$ and $c_2$ override methods from $c_3$ or any superclasses of $c_3$.

In object-oriented terminology, class c overrides method m defined in its superclass c' if, instead of inheriting the implementation of m from c', c provides its own implementation of m. Overriding methods may lead to dynamic binding, as illustrated in the example in Table 23. Classes $c_1$ and $c_2$ inherit from class java.lang.Object and override method toString of java.lang.Object. In the main method, variable o is declared of type java.lang.Object, but the concrete type of objects pointed to by o is either $c_1$ or $c_2$, depending on the number of command-line parameters passed to the program. Therefore, when the toString method of o is called, the Java Virtual Machine (JVM) makes a decision at run-time, whether to call the toString method of $c_1$ or $c_2$.

The state variable approach is used in this situation. Let $c_1$ override a method m from $c_3$ or a superclass of $c_3$. Method m of class c will use the state variable to determine whether the object of class c maps to an object of class $c_1$ or $c_2$ in the original program P. If state(this)=$c_1$, then the statements from the body of m in $c_1$ are inserted on the corresponding branch of the if statement. If state(this)=$c_2$ and $c_2$ also overrides m, then the statements from the body of m in $c_2$ are inserted on the corresponding branch of the if statement. If $c_2$ does not override m, the corresponding branch does not have statements.

TABLE 23

```
class C1 {
    public String toString( ) {return "C1";}
}
class C2 {
    public String toString( ) {return "C2";}
}
class Main {
    public static void main(String [ ] args) {
        Object o;
        if (args.length = = 0) {
            o = new C1( );
        }
        else {
            o = new C2( );
        }
        String s = o.toString( );
    }
}
```

In another exemplary embodiment, extends($c_1$)=$c_2$. Methods from superclasses of $c_2$ overridden by $c_1$ and/or $c_2$ are handled in the same way as in the last embodiment. If $c_1$ overrides any methods defined in $c_2$, but not in java.lang.Object, the state variable approach is also used. In proving functional equivalence, consider the case where there is another class, $c_3$, where extends($c_3$)=$c_2$, and show that in P, extends($c_3$)=C.

In another exemplary embodiment, a general situation is described where $c_1$ directly or indirectly extends $c_2$.

Figure 4:
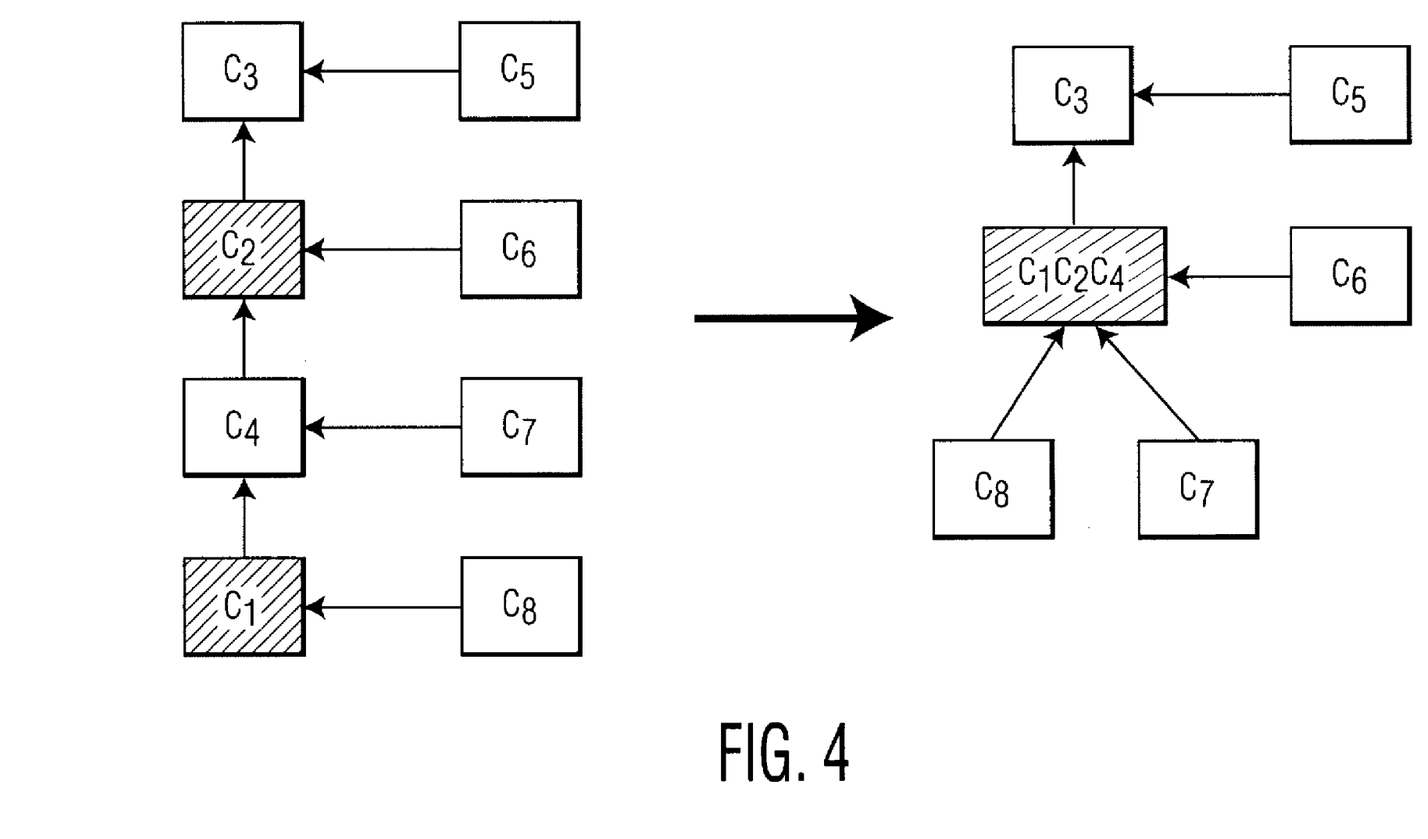
FIG. 4 is an diagram that illustrates coalescing two classes in accordance with an exemplary embodiment of the present invention.

FIG. 4 illustrates coalescing classes $c_1$ and $c_2$ in a situation where $c_1$ extends a class $c_4$ that extends $c_2$. On the left hand side of FIG. 4 is an illustration of a first class $c_1$ directly or indirectly extending a second class $c_2$ in the original program. On the right hand side of FIG. 4 is the analogous class structure relationship in the coalesced program. To coalesce $c_1$ and $c_2$, all classes in the inheritance hierarchy between $c_1$ and $c_2$ may be coalesced (class $c_4$ in FIG. 4). Because of dynamic binding, classes that inherit from the coalesced classes may also need to be changed. For example, consider class $c_7$ that inherits from coalesced class $c_4$ in FIG. 4. Suppose that $c_7$ overrides a method m from one of the classes $c_3$, $c_2$, and $c_4$. In this case, $c_7$ is modified to use a state variable, so that objects of this class can access the correct functionality for method m.

Figure 5:
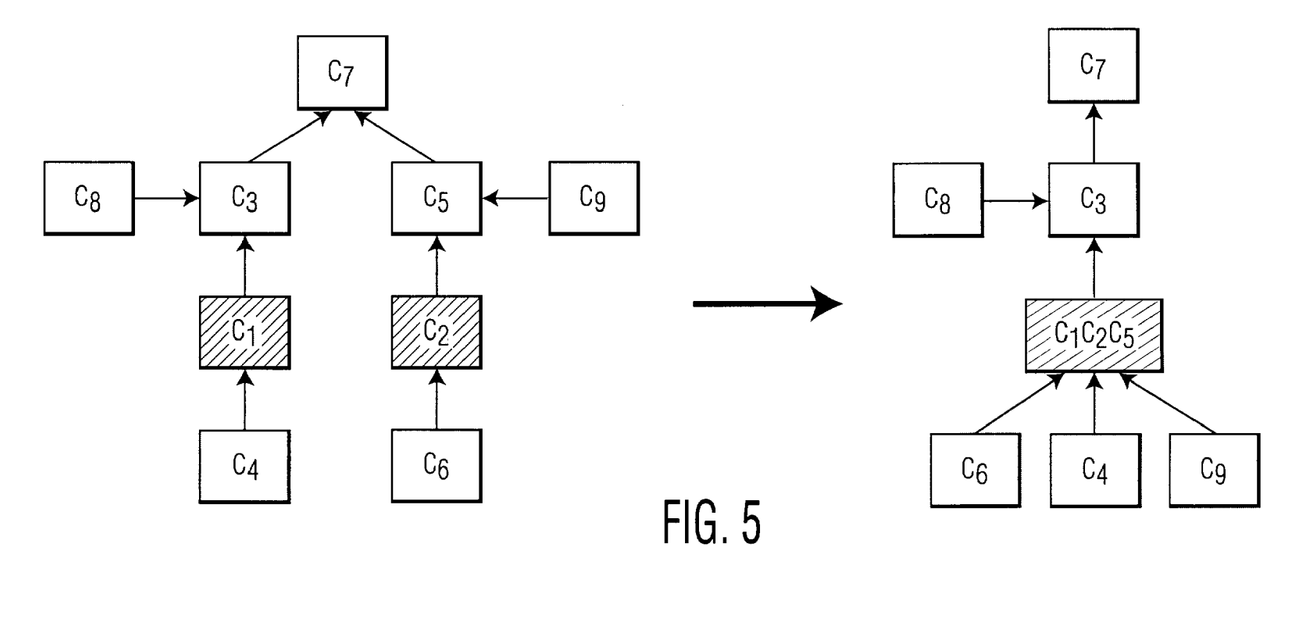
FIG. 5 is an diagram that illustrates coalescing two classes in accordance with another exemplary embodiment of the present invention.

In another exemplary embodiment, a general situation is provided where $c_1$ and $c_2$ do not directly or indirectly extend each other. FIG. 5 illustrates coalescing classes $c_1$ and $c_2$ in such a situation On the left hand side of FIG. 5 is an illustration of the class structure in a situation where first class $c_1$ and second class $c_2$ do not directly or indirectly extend each other, in the original program. On the right hand side of FIG. 5 is the analogous class structure relationship in the coalesced program. A most common superclass of $c_1$ and $c_2$ is a class that both $c_1$ and $c_2$ extend directly or indirectly and any other class directly or indirectly extended by both $c_1$ and $c_2$ is a superclass. Computation of the common superclass of $c_1$ and $c_2$ is shown in Table 24. In the example illustrated in FIG. 5, the most common superclass of $c_1$ and $c_2$ is $c_7$. Classes $c_1$ and $c_2$ are coalesced in two steps. In the first step, class $c_2$ is coalesced with all of its superclass classes that are also subclasses of the most common superclass of $c_1$ and $c_2$. In the example in FIG. 5, classes $c_2$ and $c_5$ are coalesced. In the second step, the result of the first step is coalesced with $c_1$. As such, classes $c_1$, $c_2$, and $c_5$ are coalesced in the right hand side of FIG. 5.

TABLE 24

Input: Program P and $c_1, c_2 \in$ Classes(P).
Output: The most common superclass of $c_1$ and $c_2$.
(1) Let c be the direct superclass of $c_1$
(2) While c is not a superclass of $c_2$:
(3)  Assign c to be the direct superclass of c
(4) end while Table 25 shows an algorithm for coalescing arbitrary classes.

TABLE 25

Input: A program P and two classes $c_1, c_2 \in$ Classes(P).
Output: A program P' that is functionally equivalent to P,
where Classes(P') = Classes(P) $\cup$
c \ $\{c_1, c_2\}$.
(1) If classes $c_1$ and $c_2$ are basic, apply the basic algorithm, then return
(2) If classes $c_1$ and $c_2$ implement interfaces,
but do not override any methods of their
superclasses, apply the algorithm in Table 21, then return
(3) If $c_1$ directly or indirectly implements $c_2$
(4)  coalesce $c_1$ and $c_2$ with classes $c_3$ such that $c_2$ is a superclass of $c_3$ and $c_3$ is a superclass of $c_1$
(5) If $c_1$ does not directly or indirectly implement $c_2$
(6)  Coalesce $c_2$ with classes $c_3$ such that $c_3$ is a superclass of $c_2$ and the most common predecessor of $c_1$ and $c_2$ is a superclass of $c_3$
(7) Coalesce the result of step (6) with $c_1$ In an exemplary embodiment of the present invention, let $c_1$ and $c_2$ be any classes in program P. Coalescing $c_1$ and $c_2$ using the algorithm in Table 24 transforms P into a functionally equivalent program P'.

Results of an experiment with a prototype tool implementing a class coalescing technique are presented herein. The Soot framework was used as a tool to build internal representations for bytecodes being analyzed. At the time of this experiment, the tool did not allow coalescing classes from standard Java libraries. This implies that two application classes may not be coalesced because their most common superclass has a subclass in the Java standard libraries. For example, let $c_1$ and $c_2$ be two application classes, such that $c_1$ extends the standard Java class javax.swing.Jdialog and $c_2$ extends the standard Java class javax.swing.JcomboBox (both javax.swing.JDialog and javax.swing.JComboBox are commonly used in building graphical user interfaces). Therefore, the most common superclass of $c_1$ and $c_2$ is a standard Java class java.awt.Container. As a result, in order to coalesce $c_1$ and $c_2$, a number of standard Java classes, including javax.swing.JDialog and javax.swing.JcomboBox should also be coalesced. This situation is contemplated by the present invention.

Scalability of the present invention was tested on a number of programs, including a GUI-driven commercial program with over 11,000 classes. The tool was able to successfully coalesce a number of classes in this application. Although running the tool on this large program took around two hours, almost all of this time was taken by the Soot framework to process the bytecodes.

A formal experiment was also performed using a relatively small program. This program is a Java implementation of a May Happen in Parallel (MHP) algorithm for Ada software. The goal of this study was to measure the impact of the class coalescing obfuscation on run-time requirements of this program. The MHP program is a good subject for this study because it accepts all inputs from the command line and takes a significant time to execute (over 200 seconds on some inputs).

In this study, a number of obfuscated versions of the MHP program were created by coalescing different classes. Suppose that $c_1, \ldots, c_n$ are all classes in the MHP program, arbitrarily ordered. The first coalesced version of this program was obtained by using the tool to coalesce classes $c_1$ and $c_2$. The k-th coalesced version of this program is obtained by coalescing classes $c_1, \ldots, c_{k+1}$.

Although the MHP program has around 100 classes, only the first 20 coalesced versions were constructed. All experiments were performed on a 700 MHz 4-processor machine with 2 GB of memory, running Windows 2000 Server and Sun HotSpot JDK 1.3.1. Only one of the processors was used to run the experiments.

Figure 6:
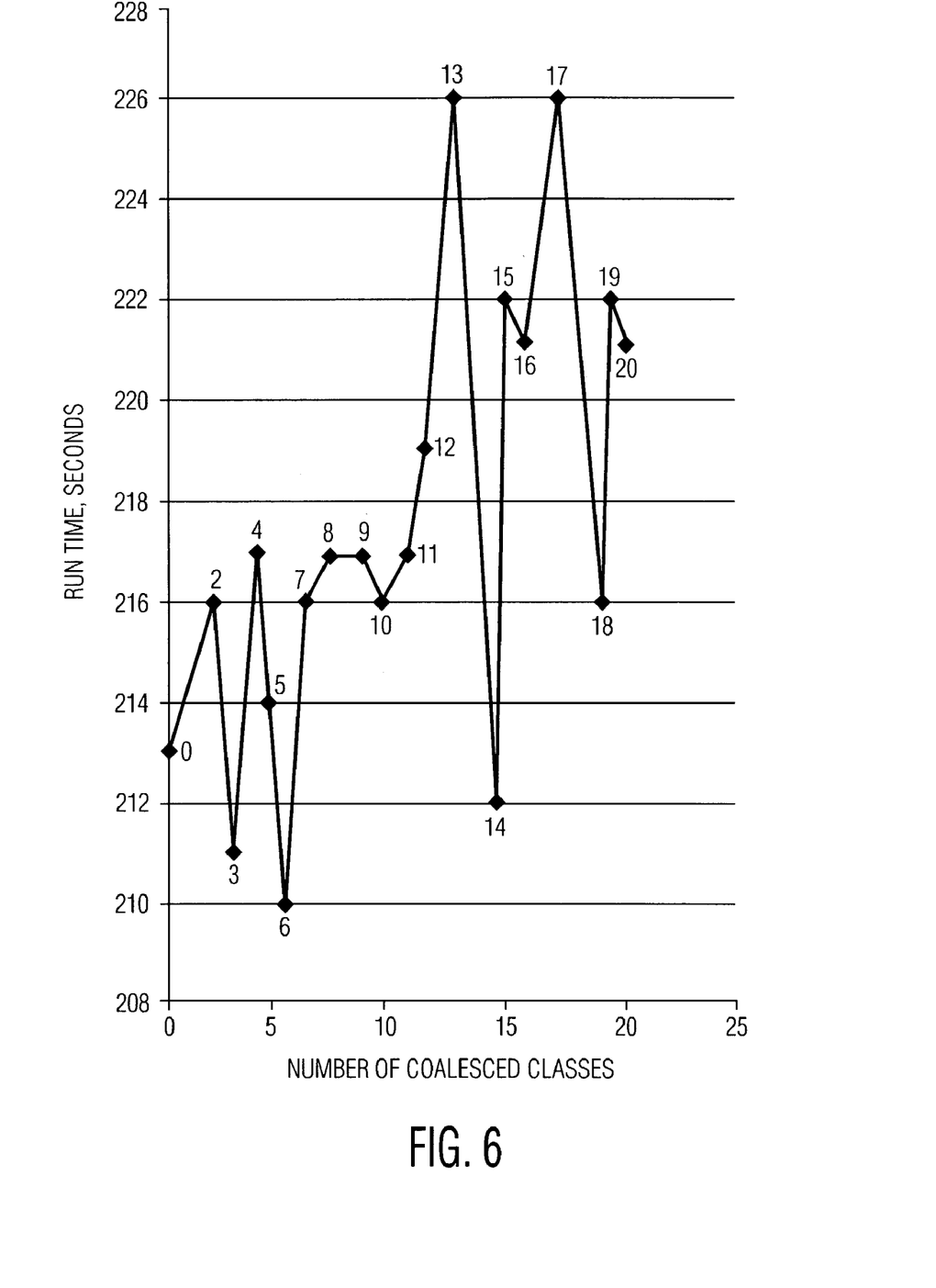
FIG. 6 is a graph of run time versus number of coalesced classes that illustrates experimental data in accordance with an exemplary embodiment of the present invention.

FIG. 6 shows the results of this comparison. Each numbered data point in this figure represents a version of the MHP program. The x-coordinate of a point is the number of classes coalesced (the x-coordinate of the original MHP program is 0). The y-coordinate of a point is the running time in seconds. In general, these preliminary data points indicate that the impact of the class coalescing obfuscation on the running time of the program is not significant for a small number of classes being coalesced. The lower running times for the MHP versions with 3 and 6 obfuscated classes appear to be caused by more efficient loading of classes that are achieved by the JVM in these situations (in Java, the bytecodes for each class in the application are loaded dynamically, on demand). Class coalescence reduces the number of classes in the program, thereby making the granularity at which classes are loaded more coarse).

It is contemplated that class coalescence may be combined with other obfuscation techniques (e.g., the Soot framework used for the underlying program analysis automatically means that an additional obfuscation of replacing the names of all class variables with nonsensical names is performed).

Further still, data relating to various features of the classes being coalesced may be collected, such as the number of fields and the number of objects of the class that is created when the program runs. This data enables a fine-grained analysis of the trade-off between the amount of obfuscation and the running time of the obfuscated program. This may be implemented using heuristics. Once these heuristics are incorporated in the class coalescing tool, the users are able to balance the required level of obfuscation against the potential program slow-down via simple graphical controls. The underlying heuristics automatically determine which classes are to be coalesced to achieve this goal.

Malicious attacks on software can be classified into reverse engineering, tampering, and theft. Attackers use reverse engineering to understand the software and possibly learn trade secrets. Software tampering is a threat where the functionality of software can be changed to perform an illegal task or obtain access to privileged data. Software theft costs the US software industry billions of dollars a year.

To protect software from these attacks several methods have been developed, many of which may be combined with class coalescence. Proof carrying code is a technique for including in the binary code its semantic checksum, which can be used to prove that the code obeys the safety policy of the host and has not been tampered with (See e.g., G. C. Necula, Proof-carrying code: In *Proceedings of the 24th ACM Symposium on Principles of Programming Languages*, pages 106–119, January 1997; G. C. Necula, Proof-carrying code: design, implementation and applications (abstract). In *Proceedings of the 2nd International ACM SIGPLAN Conference on Principles and Practice of Declarative Programming (PPDP-00)*, pages 175–177, September 2000). Software Watermarking embeds a watermark, a message proving ownership, in the program code, thereby making it possible to detect theft. (See e.g., C. Collberg and C. Thomborson, Software watermarking: Models and dynamic embeddings. In *Proceedings of ACM SIGPLAN Symposium on Principles of Programming Languages*, pages 311–324, January 1999). Obfuscation techniques are used to prevent reverse engineering or make it prohibitively expensive for attackers. In practice, obfuscation should be used in combination with other software protection techniques, such as watermarking. Since the class coalescing techniques described in this application are obfuscation techniques, additional software obfuscation approaches are now described in detail.

Reverse engineering efforts rely on automated techniques for extracting source code for an application. For example, Mocha is an automated tool for extracting Java source code from Java class (compiled code) files. In practice, in addition to automated techniques, reverse engineering requires manual effort in understanding the program. Therefore, a successful obfuscation tool desirably applies methods that inhibit application of both automated and manual reverse engineering techniques.

One classification of obfuscating transformations identifies several categories of obfuscations, based on the aspects of the application that these obfuscation modify (See, e.g., C. Collberg, C. Thomborson, and D. Low. A taxonomy of obfuscating transformations. Technical Report 148, July 1997).

Lexical (or Layout) transformations target information that does not affect the execution of the program. For example, lexical transformations include changing the format of statements, changing names of variables and operations, and removing comments.

Control transformations try to hide the real control flow of a program. They are further classified into aggregation transformations (e.g. inlining methods, outlining statements, cloning methods and unrolling loops), ordering transformations (e.g. reordering statements, loops and expressions), and computations (e.g. extending loop conditions, table interpretation, etc.). To apply control transformations, opaque predicates are used. Opaque predicates are predicates that have some property, known to the obfuscator, but unknown to the deobfuscator or the reverse engineer (See, e.g., C. Collberg, C. Thomborson, and D. Low. A taxonomy of obfuscating transformations. Technical Report 148, July 1997; C. Collberg, C. Thomborson, and D. Low. Manufacturing cheap, resilient, and stealthy opaque constructs. In *Principles of Programming Languages* 1998, *POPL '98*, San Diego, Calif., January 1998).

Several obfuscation techniques rely on aliasing that often occurs in programs using pointers (See, e.g., C. Collberg, C. Thomborson, and D. Low. Manufacturing cheap, resilient, and stealthy opaque constructs. In *Principles of Programming Languages* 1998, *POPL '98*, San Diego, Calif., January 1998). Aliasing occurs when two variables refer to the same memory location. Alias analysis problems are known to be NP-Complete. To reverse engineer control transformations based on knowledge of aliasing information in the program, a reverse engineering tool desirably performs a precise alias analysis, which for large programs is likely to be computationally prohibitive.

Data transformations target the data structures in the program. They are classified into storage transformations (e.g. splitting variables, converting static data to procedures, etc.), encoding transformations (e.g. changing encoding, changing variable lifetimes), aggregation transformations (e.g. modifying inheritance relations, split, fold and merge arrays, merge scalar variables) and ordering transformations (e.g. reordering instance variables, methods and arrays).

In addition to this classification, preventive transformations are identified. These transformations target known weaknesses in reverse engineering tools. Their goal is not to make the program harder to understand for the human user, but to prevent reverse engineering tools from working. For example, Crema includes some features that causes Mocha to crash before decompiling a program.

Class coalescence fit both in the category of data obfuscations, because it modifies the inheritance relations and data types, and the category of control obfuscations, since the control flow of the program may be hidden after coalescing.

Numerous obfuscation tools (e.g. Crema, WingGuard, SourceGuard, Condensity, and JCLoak) have been developed, although most of them use only lexical transformations. Many compiler optimizations can also be viewed as obfuscations since they often make programs less understandable. Soot, a Java bytecode optimization framework, is an example of a compiler optimization tool that can be used for obfuscation. (See, e.g., P. Pominville, F. Qian, R. Vallee-Rai, L. Hendren, and C. Verbrugge. A framework for optimizing java using attributes).

Jax is an application extractor for Java. This technique has been developed with the goal of reducing size of Java programs that are sent across networks (See, e.g., F. Tip, C. Laffra, P. F. Sweeney, and D. Streeter. Practical experience with an application extractor for Java. *ACM SIGPLAN Notices*, 34(10):292–305, 1999). Transformations in Jax include removal of redundant attributes such as local variable name tables and line-number tables, removal of redundant methods and fields, inlining of some method calls, transformation of the class hierarchy, and renaming of packages, classes, methods and fields. As a result, both the structure and lexical content of a program to which Jax is applied can change considerably. There are several differences between Jax and our coalescing technique. While transforming the class hierarchy, Jax may merge a derived class with its base class, whereas our method can merge classes that are not related by inheritance.

Collberg, Thomborson, and Low describe methods for obfuscating data abstractions (See, e.g., C. Collberg, C. Thomborson, and D. Low. Manufacturing cheap, resilient, and stealthy opaque constructs. In *Principles of Programming Languages* 1998, *POPL '98*, San Diego, Calif., January 1998). These methods include splitting a class into a base and a derived class and adding bogus false classes to the base class after splitting. This transformation is radically different from the technique of coalescing classes described above. This technique can be combined with the coalescence approach of the present invention to provide a further obfuscated program.

Class coalescence, and obfuscating transformation, which decrease a program's understandability by coalescing two or more classes has been described herein. Since the object-oriented abstractions originally present in the program are removed and/or obscured, understanding the software or a part of the software is harder than before. Detailed algorithms of class coalescing are given along with theorems proving the validity of the technique. A basic algorithm is described in which classes that have to be coalesced do not inherit from other classes. This basic algorithm is followed by an extended algorithm, where the restrictions on inheritance are relaxed.

Class coalescence is an effective obfuscation method, because it breaks both high- and low-level abstractions in the program. A prototype tool has been implemented based on this method and successfully applied it to several large programs. In addition, a relatively small but long running Java program was used to evaluate the trade-off between the strength of obfuscation and the running time of the program. The results of this experiments are very encouraging, showing that even coalescing a significant number of classes in a program results in very modest increase in its running time. In some cases, where a small number of classes were coalesced, it has been observed that the obfuscated program has faster running time than the original program.

Although illustrated and described above with reference to certain specific embodiments, the present invention is nevertheless not intended to be limited to the details shown. Rather, various modifications may be made in the details within the scope and range of equivalence of the claims and without departing from the invention.

What is claimed:

1. A method of obfuscating an object-oriented program comprising the steps of:
   providing a program defined in terms of a plurality of classes, each of the classes having at least one of a field or a method;
   combining at least two of the plurality of classes into a combined class, said step of combining comprising at least one of
      (a) including at least one field from at least one of the two classes in the combined class, or
      (b) including at least one method from at least one of the two classes in the combined class;
   removing the at least two of the plurality of classes from the program; and
   storing the program that includes the combined class.

2. The method of claim 1 wherein said step of combining comprises:
   including at least one field from each of the at least two classes in the combined class.

3. The method of claim 1 wherein said step of combining comprises:
   including at least one method from each of the at least two classes in the combined class.

4. The method of claim 1 wherein said step of combining comprises:
   including at least one field from each of the at least two classes in the combined class, and
   including at least one method from each of the at least two classes in the combined class.

5. The method of claim 1 additionally comprising the step of:
   renaming at least one of a plurality of variables in the combined class in order to further obfuscate the program.

6. The method of claim 1 wherein the program includes an interface implemented by at least one of the at least two classes, the method additionally comprising the step of:
   deleting the interface.

7. The method of claim 1 further comprising the step of:
   including a watermark in the program.

8. The method of claim 1 wherein at least one of the at least two classes combined is an inner class, and the step of combining includes the step of converting the inner class into a non-inner class.

9. The method of claim 1 wherein at least one of the at least two classes to be combined is an abstract class, and the step of combining includes converting the abstract class into a concrete class.

10. The method of claim 1 additionally comprising the step of:
    transmitting the program after said step of combining.

11. A method of obfuscating an object-oriented program comprising the steps of:
    copying a first program to provide a second program;
    combining a first class and a second class included in the first program to produce a combined class in the second program;
    replacing all uses of the first class and the second class in the second program with respective uses of the combined class in the second program;
    removing the at least two of the plurality of classes from the program; and
    storing the second program that includes the combined class.

12. The method of claim 11 additionally comprising the step of:
    renaming references to the first class and the second class with references to the combined class in the second program.

13. The method of claim 11 additionally comprising the step of:
    removing the first class and the second class from the second program.

14. The method of claim 11 additionally comprising the step of:
    mapping each of a plurality of types included in the first program with a respective type in the second program.

15. The method of claim 11 additionally comprising the step of:
    setting a visibility of the combined class in the second program based on the visibility of the first class and the second class in the first program.

16. The method of claim 11 wherein said step of replacing includes:
    converting each of a plurality of constructors included in the first class and the second class into a respective constructor in the combined class;
    converting each of a plurality of methods included in the first class and the second class into a respective method in the combined class; and
    converting each of a plurality of fields included in the first class and the second class into a respective field in the combined class.

17. A method of obfuscating an object-oriented program comprising the steps of:
    copying a first program to provide a second program;
    combining a first class and a second class included in the first program to produce a combined class in the second program;
    mapping each of a plurality of types included in the first program with a respective type in the second program;
    replacing all uses of the first class and the second class in the second program with respective uses of the combined class in the second program;
    removing the first class and the second class from the second program; and
    storing the second program that includes the combined class.

18. A computer readable medium including computer program instructions which cause a computer to implement a method for obfuscating an object-oriented program comprising the steps of:
    providing a program defined in terms of a plurality of classes, each of the classes having at least one of a field and a method;

combining at least two of the plurality of classes into a combined class, said step of combining comprising at least one of
  (a) including at least one field from at least one of the two classes in the combined class, or
  (b) including at least one method from at least one of the two classes in the combined class;

removing the at least two of the plurality of classes from the program; and storing the program that includes the combined class.

19. A computer readable medium including computer program instructions which cause a computer to implement a method for obfuscating an object-oriented program comprising the steps of:

copying a first program to provide a second program;

combining a first class and a second class included in the first program to produce a combined class in the second program;

placing all uses of the first class and the second class in the second program with respective uses of the combined class in the second program;

removing at least the first and second classes from the program; and storing the second program that includes the combined class.

20. A computer readable medium including computer program instructions which cause a computer to implement a method for obfuscating an object-oriented program comprising the steps of:

copying a first program to provide a second program;

combining a first class and a second class included in the first program to produce a combined class in the second program;

mapping each of a plurality of types included in the first program with a respective type in the second program;

replacing all uses of the first class and the second class in the second program with respective uses of the combined class in the second program;

removing the first class and the second class from the second program; and storing the second program that includes the combined class.

* * * * *